(12) United States Patent
Curtis et al.

(10) Patent No.: US 11,494,518 B1
(45) Date of Patent: Nov. 8, 2022

(54) METHOD AND APPARATUS FOR SPECIFYING POLICIES FOR AUTHORIZING APIS

(71) Applicant: Styra, Inc., Redwood City, CA (US)

(72) Inventors: Andrew Curtis, San Mateo, CA (US); Mikol Graves, San Francisco, CA (US); Teemu Koponen, San Francisco, CA (US); Timothy L. Hinrichs, Los Altos, CA (US); Torin Sandall, San Francisco, CA (US)

(73) Assignee: STYRA, INC., Redwood City, CA (US)

( * ) Notice: Subject to any disclaimer, the term of this patent is extended or adjusted under 35 U.S.C. 154(b) by 215 days.

(21) Appl. No.: 16/914,239

(22) Filed: Jun. 26, 2020

Related U.S. Application Data

(60) Provisional application No. 63/036,991, filed on Jun. 9, 2020, provisional application No. 62/984,291, filed on Mar. 2, 2020.

(51) Int. Cl.
*G06F 9/54* (2006.01)
*G06F 21/62* (2013.01)

(52) U.S. Cl.
CPC ............. *G06F 21/629* (2013.01); *G06F 9/54* (2013.01)

(58) Field of Classification Search
CPC ........ G06F 9/54; G06F 16/122; G06F 16/185; G06F 21/629; H04L 29/06
(Continued)

(56) References Cited

U.S. PATENT DOCUMENTS 5,329,626 A 7/1994 Klein et al.
5,974,549 A 10/1999 Golan
(Continued)

OTHER PUBLICATIONS

Ma, Chen-Hua, et al., "Conflict Detection and Resolution for Authorization Policies in Workflow Systems," Journal of Zhejiang University Science A, Aug. 1, 2009, 11 pages, vol. 10, Zhejiang University Press, Hangzhou, China.
(Continued)

*Primary Examiner* — Hoan H Tran
(74) *Attorney, Agent, or Firm* — Adeli LLP

(57) ABSTRACT

Some embodiments provide API (Application Programming Interface) authorization platform that allows API-authorization policy stacks to be created and enforced. Policy stacks (called "stacks") define API-authorization policies across different sets of managed resources in a workspace. A stack in some embodiments defines a uniform set of one or more API-authorization policies for multiple different sets of resources so that the set of policies do not have to be specified independently for each set of resources. By instituting common policies across multiple managed resource sets (also called managed systems), stacks can be used to guarantee uniform baseline policies for the workspace. A stack is typically applied to several managed resources that share a common trait (e.g., share a particular type). The API-authorization platform of some embodiments allows an administrator to define the traits of the managed resources through labels (e.g., key value pairs) that are associated with the stacks and the managed systems. This platform in some embodiments also allows a stack to specify an exception for a managed system based on one or more features of the system that are expressed in a rich feature data structure of the system.

20 Claims, 14 Drawing Sheets

(58) Field of Classification Search
USPC .......................................................... 726/1
See application file for complete search history.

(56) References Cited

U.S. PATENT DOCUMENTS

| | | | |
|---|---|---|---|
| 6,985,953 B1 | 1/2006 | Sandhu et al. | |
| 7,124,192 B2 | 10/2006 | High, Jr. et al. | |
| 7,752,661 B2 | 7/2010 | Hemsath et al. | |
| 8,266,694 B1 | 9/2012 | Roy | |
| 8,613,070 B1 | 12/2013 | Borzycki et al. | |
| 8,683,560 B1 | 3/2014 | Brooker et al. | |
| 8,789,138 B2 | 7/2014 | Reierson et al. | |
| 9,171,172 B2 | 10/2015 | Goldschlag et al. | |
| 9,246,986 B1 * | 1/2016 | Ward, Jr | H04L 67/10 |
| 9,397,990 B1 | 7/2016 | Taly et al. | |
| 9,471,798 B2 | 10/2016 | Vepa et al. | |
| 9,501,666 B2 | 11/2016 | Lockett et al. | |
| 9,530,020 B2 * | 12/2016 | Brandwine | G06F 21/6218 |
| 9,648,040 B1 | 5/2017 | Morkel et al. | |
| 9,652,271 B2 | 5/2017 | Cropper | |
| 9,792,459 B2 | 10/2017 | Forsberg et al. | |
| 9,848,041 B2 | 12/2017 | Einkauf et al. | |
| 10,122,757 B1 | 11/2018 | Kruse et al. | |
| 10,127,393 B2 * | 11/2018 | Ferraiolo | G06F 16/284 |
| 10,257,184 B1 | 4/2019 | Mehta et al. | |
| 10,353,726 B2 | 7/2019 | Duan | |
| 10,362,623 B2 | 7/2019 | Liang et al. | |
| 10,432,644 B2 | 10/2019 | Burns et al. | |
| 10,454,975 B1 | 10/2019 | Mehr | |
| 10,459,647 B1 | 10/2019 | Lazier et al. | |
| 10,469,314 B2 | 11/2019 | Ennis, Jr. et al. | |
| 10,592,302 B1 | 3/2020 | Hinrichs et al. | |
| 10,601,876 B1 | 3/2020 | Levy | |
| 10,613,888 B1 | 4/2020 | Mentz et al. | |
| 10,715,514 B1 | 7/2020 | Threlkeld | |
| 10,719,373 B1 | 7/2020 | Koponen et al. | |
| 10,740,287 B2 | 8/2020 | Haviv et al. | |
| 10,789,220 B2 | 9/2020 | Mayer et al. | |
| 10,802,746 B1 | 10/2020 | Lazier et al. | |
| 10,984,133 B1 | 4/2021 | Hinrichs et al. | |
| 10,986,131 B1 | 4/2021 | Kruse et al. | |
| 10,990,702 B1 | 4/2021 | Hinrichs et al. | |
| 11,023,292 B1 | 6/2021 | Hinrichs et al. | |
| 11,080,410 B1 | 8/2021 | Sandall et al. | |
| 11,108,827 B2 | 8/2021 | Beckman et al. | |
| 11,108,828 B1 | 8/2021 | Curtis et al. | |
| 11,170,099 B1 | 11/2021 | Sandall et al. | |
| 11,245,728 B1 | 2/2022 | Curtis et al. | |
| 11,258,824 B1 | 2/2022 | Hinrichs et al. | |
| 11,327,815 B1 | 5/2022 | Koponen et al. | |
| 2007/0156670 A1 | 7/2007 | Lim | |
| 2009/0063665 A1 | 3/2009 | Bagepalli et al. | |
| 2009/0077618 A1 | 3/2009 | Pearce et al. | |
| 2010/0333079 A1 | 12/2010 | Sverdlov et al. | |
| 2011/0113484 A1 | 5/2011 | Zeuthen | |
| 2012/0030354 A1 | 2/2012 | Razzaq et al. | |
| 2012/0110651 A1 | 5/2012 | Biljon et al. | |
| 2012/0311672 A1 | 12/2012 | Connor et al. | |
| 2012/0331539 A1 | 12/2012 | Matsugashita | |
| 2013/0226970 A1 | 8/2013 | Weber et al. | |
| 2014/0032691 A1 | 1/2014 | Barton et al. | |
| 2014/0032759 A1 | 1/2014 | Barton et al. | |
| 2014/0033267 A1 | 1/2014 | Aciicmez | |
| 2014/0237594 A1 | 8/2014 | Thakadu et al. | |
| 2015/0089575 A1 | 3/2015 | Vepa et al. | |
| 2016/0057107 A1 | 2/2016 | Call et al. | |
| 2017/0034075 A1 | 2/2017 | Burk et al. | |
| 2017/0161120 A1 | 6/2017 | Sasaki et al. | |
| 2017/0220370 A1 | 8/2017 | Klompje et al. | |
| 2017/0237729 A1 | 8/2017 | Uppalapati | |
| 2017/0346807 A1 | 11/2017 | Blasi | |
| 2017/0364702 A1 | 12/2017 | Goldfarb et al. | |
| 2018/0067790 A1 | 3/2018 | Chheda et al. | |
| 2018/0082053 A1 | 3/2018 | Brown et al. | |
| 2018/0109538 A1 | 4/2018 | Kumar et al. | |
| 2018/0309746 A1 | 10/2018 | Blasi | |
| 2019/0007418 A1 | 1/2019 | Cook et al. | |
| 2019/0007443 A1 | 1/2019 | Cook et al. | |
| 2019/0230130 A1 | 7/2019 | Beckman et al. | |
| 2019/0245862 A1 | 8/2019 | Kruse et al. | |
| 2019/0386973 A1 | 12/2019 | Patwardhan et al. | |
| 2020/0007580 A1 | 1/2020 | Liderman et al. | |
| 2021/0029029 A1 | 1/2021 | Mehmedagic et al. | |
| 2021/0240507 A1 | 8/2021 | Colombet et al. | |
| 2021/0240550 A1 | 8/2021 | Hinrichs et al. | |
| 2021/0248017 A1 | 8/2021 | Hinrichs et al. | |
| 2021/0365571 A1 | 11/2021 | Sandall et al. | |

OTHER PUBLICATIONS

Mohan, Apurva, et al., "An Attribute-based Authorization Policy Framework with Dynamic Conflict Resolution," IDTRUST '10: Proceedings of the 9th Symposium on Identity and Trust on the Internet, Apr. 13-15, 2010, 14 pages, ACM, Gaithersburg, Maryland, USA.

Non-Published commonly Owned U.S. Appl. No. 16/050,119, filed Jul. 31, 2018, 55 pages, Styra, Inc.

Non-Published commonly Owned U.S. Appl. No. 16/050,123, filed Jul. 31, 2018, 56 pages, Styra, Inc.

Non-Published commonly Owned U.S. Appl. No. 16/050,143, filed Jul. 31, 2018, 56 pages, Styra, Inc.

Non-Published commonly Owned U.S. Appl. No. 16/914,243 with similar specification, filed Jun. 26, 2020, 47 pages, Styra, Inc.

Non-Published commonly Owned U.S. Appl. No. 16/914,244 with similar specification, filed Jun. 26, 2020, 47 pages, Styra, Inc.

Author Unknown, "API Best Practices Managing the API Lifecycle: Design, Delivery, and Everything in Between," Dec. 2016, 37 pages, Apigee, retrieved from https://pages.apigee.com/rs/351-WXY-166/images/API-Best-Practices-ebook-2016-12.pdf.

Costa, Jeff, "Improve API Performance with Caching," API Gateway, May 3, 2018, 18 pages, Akamai Developer, retrieved from https://developer.akamai.com/blog/2018/05/31/improve-api-performance-caching.

Win, Thu Yein, et al., "Virtualization Security Combining Mandatory Access Control and Virtual Machine Introspection," 2014 IEEE/ACM 7th International Conference on Utility and Cloud Computing, Dec. 8-11, 2014, IEEE, London, UK.

* cited by examiner

production > Admission Control > Rules
ecbfcab4b2b945c6b6f2c6c6e5be0d29

| Swimlanes | <> Code | ☑+ Add rule | ⊕ Workspace | ⬇ | 🗑 | ✎ Draft | | | RULES 1 | MONITORED 0 | ENFORCED 1 |

◉ Preview ⊙ Validate

WORKSPACE
- expo

SYSTEMS
- ∨ bison
  - Decision Mask
  - Features
  - Labels
  - > Admission Control
- ∨ buffalo — 710

STACKS
- ∨ monitor — 805
- ∨ Production
  - Decision Mask — 810
  - Selectors — 815
  - ∨ Admission Control
    - Rules [Draft]
    - PCI DSS v3.2
    - Tests

[Ignore] [Monitor] [Enforce] ...

Restrict Proxies

```
         "message": message
    } enforce[decision] {
    # title: Restrict Proxies has_prohibited_proxy decision := {
        "allowed": false,
        "message": springf("Proxy %v isn't approved", [proxy])
    }
} has_prohibited_proxy {
    not features.approved_proxies ==
    features.approved_proxies
    not approved_proxies[input.proxy]
} has_prohibited_proxy {
    not features.approved_proxies[input.proxy]
    Not approved_proxies[input.proxy]
} features := data.metadata[data.context.system_id].features approved_proxies := {
    "https://us-cent-proxy.cicd.co",
    "https://us-east-proxy.cicd.co",
    "https://us-west-proxy.cicd.co"
}
```

A.A.P.P.

WORKSPACE
- expo

SYSTEMS
- bison
- buffalo
  - Decision Mask
  - Features
  - Labels
  - Admission Control

STACKS
- monitor
- Production
  - Decision Mask — 810
  - Selectors
  - Admission Control
    - Rules
    - PCI DSS v3.2
    - Tests production > Selectors
ecbfcab4b2b945c6b6f2c6c6e5be0d29 — 1000

RULES  MONITORED  ENFORCED
  0         0          0

[Workspace] [↓] [🏛] [✎ Draft]   ⊙ Preview ⊘ Validate

Selectors

Specify the labels that identify the systems this stack should and shouldn't manage (i.e., 'include' and 'exclude'). Hint: You can match more than one value per key, or no value at all if you need to match the key on its own.

include (optional)

label: type
[ production × ]

label: compliance
[ pci × ]    — 1025 / 1030 exclude (optional)

label: Key (e.g., environment)
Values (e.g., production)    — 1010

```
package stacks.ecbfcab4b2b945c6b6f2c6c6e5be0d29.selectors import data.library.v1.utils.labels.match.v1 as match systems[system_id] {
    include := {
        "type": {
            "production"
        },
        "compliance": {
            "pci"
        }
    } exclude := {} metadata := data.metadata[system_id]
    match.all(metadata.labels.labels, include, exclude)
}
```
— 1005

*Figure 10*

METHOD AND APPARATUS FOR SPECIFYING POLICIES FOR AUTHORIZING APIS

BACKGROUND

Most applications today use access control rules to allow different users with different privileges, different access to the applications and their resources. Typically, the access controls are coded within an application's code base, which makes it very difficult to modify these controls statically, and impossible to modify them dynamically while the application is running.

SUMMARY

Some embodiments provide API (Application Programming Interface) authorization platform that allows API-authorization policy stacks to be created and enforced. Policy stacks (called "stacks") define API-authorization policies across different sets of managed resources in a workspace. Examples of a workspace in some embodiments include a software defined datacenter (SDDC), or several sets of resources deployed by an organization (entity) in one or more private and/or public cloud datacenters. Examples of managed resources sets in some embodiments include different Kubernetes clusters, different applications executing on one or more clusters, different distributed data storages, etc. Each set of managed resources is also referred to below as a managed system.

A stack in some embodiments defines a uniform set of one or more API-authorization policies for multiple different sets of resources so that the set of policies do not have to be specified independently for each set of resources. By instituting common policies across multiple managed resource sets (called managed systems below), stacks can be used to guarantee uniform baseline policies for the workspace. A stack is typically applied to several managed resources that share a common trait (e.g., share a particular type). The API-authorization platform of some embodiments allows an administrator to define the traits of the managed resources through labels (e.g., key value pairs) that are associated with the stacks and the managed systems. This platform in some embodiments also allows a stack to specify an exception for a managed system based on one or more features of the system that are expressed in a rich feature data structure of the system.

An administrator of a managed system in some embodiments can also specify API-authorization policies for the system. Such policies are referred to below as system level policies, or system policies. The system policies for a managed system implements specific logic for the system. However, in some embodiments, the system policies are subservient to the stack policies in order to ensure that the common policies specified by stacks are enforced for all applicable managed systems uniformly. In other words, assigning stacks with higher priority than system policies allows stacks to implement organizational supervision and enforcement. Stack and system policies in some embodiments have separate source control mechanisms to allow them to be stored in desired repositories (e.g., Git repositories) independently.

Workspace administrators can specify two or more policy stacks that might produce conflicting responses for an API call. In some embodiments, the API-authorization platform provides conflict resolution schemes for resolving such conflicts. For instance, in some embodiments, the platform allows stack policies to be specified with a priority level, such as low, medium or high. When two stack policies produce conflicting decisions for an API call (e.g., one specifies that the call should be rejected, while the other specifies that the call should be allowed), the stack policy with the higher priority wins. The conflict resolution process in some embodiments is performed by policy enforcing agents that execute in the same failure domain as the software resource to which the API call is directed.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawings.

BRIEF DESCRIPTION OF THE DRAWINGS

The novel features of the invention are set forth in the appended claims. However, for purposes of explanation, several embodiments of the invention are set forth in the following figures.

FIG. 8 illustrates an example of one set of policies specified by one set of rules.

FIG. 10 illustrates an example of specifying labels for the Production stack.

DETAILED DESCRIPTION OF THE INVENTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide API (Application Programming Interface) authorization platform that allows API-authorization policy stacks to be created and enforced. Policy stacks (called "stacks") define API-authorization policies across different sets of managed resources in a workspace. The API-authorizing platform of some embodiments defines, distributes and enforces policy stacks for authorizing API calls to software resources executing on one or more sets of associated machines (e.g., virtual machines, containers, computers, etc.) in a workspace.

Examples of a workspace in some embodiments include a software defined datacenter (SDDC), or several sets of resources deployed by an organization (entity) in one or more private and/or public cloud datacenters. Examples of managed resources sets in some embodiments include different Kubernetes clusters, different applications executing on one or more clusters, different distributed data storages, etc. Each set of managed resources is also referred to below as a managed system. API authorization is distinct from API authentication in some embodiments. API authentication authenticates the identity of the API-call's source (e.g., validates the access credentials associated with the API call). API authorization, on the other hand, determines whether the API call is authorized (i.e., whether the operation associated with the API call should be performed).

Figure 1:
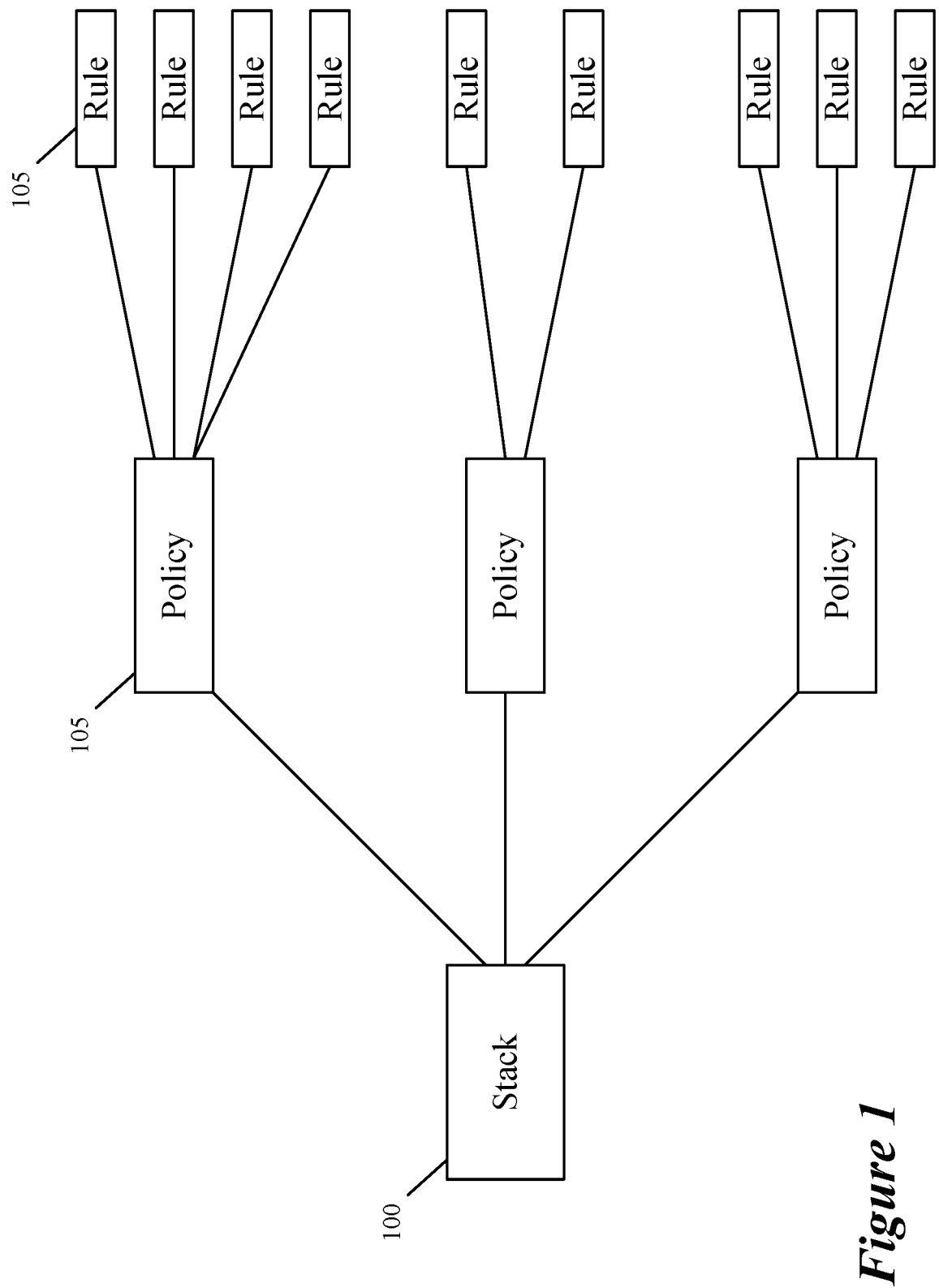
FIG. 1 illustrates an example of an API-authorization policy stack with multiple API-authorization policies, each of which includes multiple rules.

A stack in some embodiments defines a uniform set of API-authorization policies for multiple different sets of resources so that the set of policies do not have to be specified independently for each set of resources. An API-authorization policy stack includes one or more API-authorization policies, with each policy including one or more rules. FIG. 1 illustrates an example of an API-authorization policy stack 100 with multiple API-authorization policies 105, each of which includes multiple rules.

By instituting common policies across multiple managed resource sets (called managed systems below), stacks can be used to guarantee uniform baseline policies for the workspace. A stack is typically applied to several managed resources that share a common trait (e.g., share a particular type). The API-authorization platform of some embodiments allows an administrator to define the traits of the managed resources through labels (e.g., key value pairs) that are associated with the stacks and the managed systems. This platform in some embodiments also allows a stack to specify an exception for a managed system based on one or more features of the system that are expressed in a rich feature data structure of the system.

Administrators of managed systems in some embodiments can also specify API-authorization policies for their respective systems. Such policies are referred to below as system level policies, or system policies. The system policies for a managed system implements specific logic for the system. However, in some embodiments, the system policies are subservient to the stack policies in order to ensure that the common policies specified by stacks are enforced for all applicable managed systems uniformly.

Figure 2:
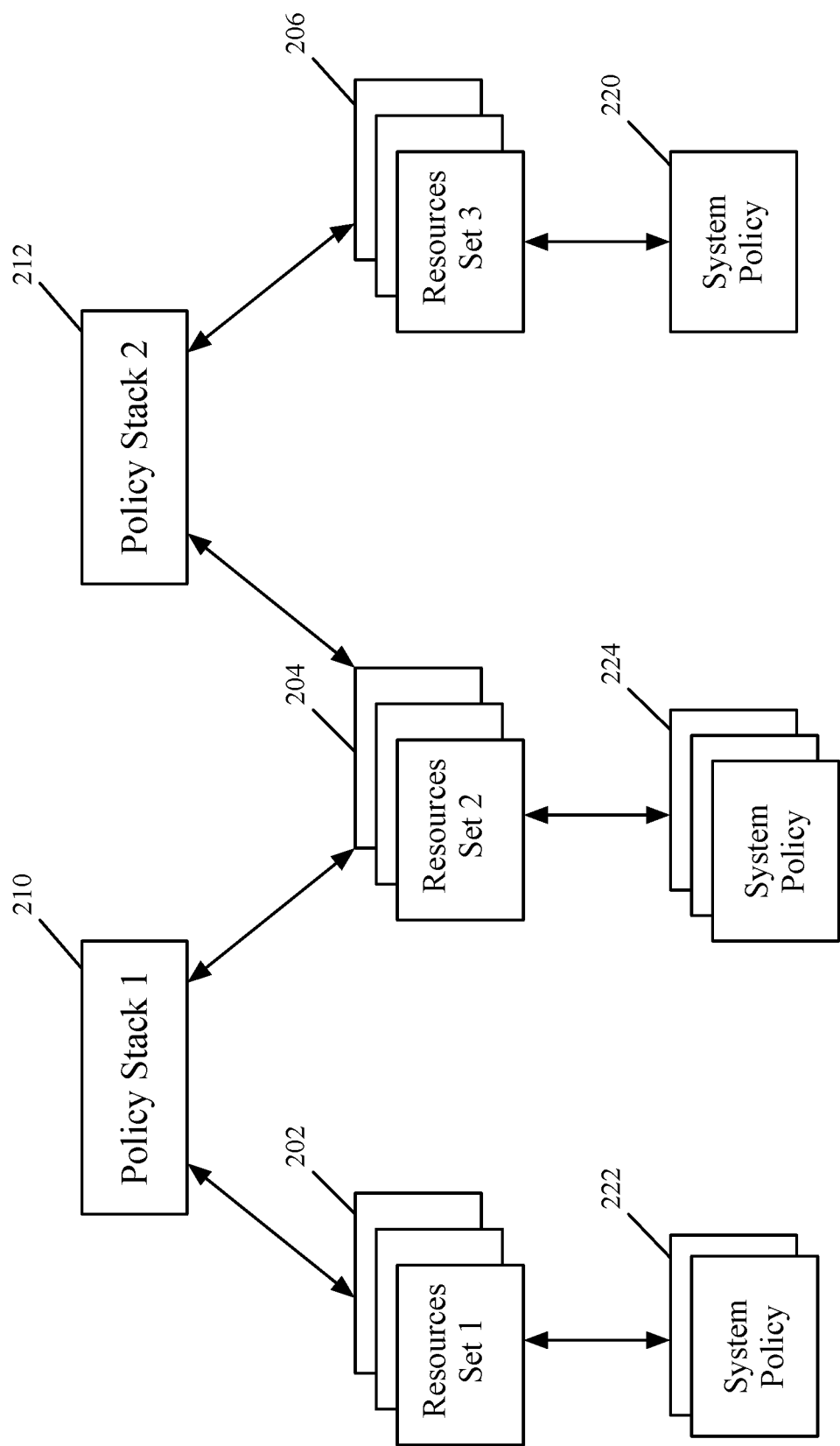
FIG. 2 illustrates an example of three systems that have associated API-authorization policy stacks and API-authorization system policies.

FIG. 2 illustrates an example of three systems 202, 204 and 206 that have associated API-authorization policy stacks and API-authorization system policies. Each system 202, 204 or 206 is a cluster of resources, such as a Kubernetes cluster, an application cluster, data storage cluster, etc. In the example illustrated in FIG. 2, two policy stacks 210 and 212 are applicable to API calls made to three systems 202, 204 and 206, with the policy stack 210 being applicable to API calls to systems 202 and 204 and the policy stack 212 being applicable to API calls to systems 204 and 206.

This example also shows each system governed by one, two or three sets of system policies, with one system policy 220 for the system 206, two system policies 222 for the system 202, and three system policies 224 for the system 204. As illustrated by FIG. 2, a policy stack can be applicable to multiple systems, and one system can be governed by multiple policy stacks and multiple sets of system policies.

The following example illustrates how some embodiments utilize stacks. Consider a company (Ace) that maintains a collection of applications deployed on Kubernetes clusters in two regions: the US and the EU. Each region is subject to its own governmental regulations so even if an application is nominally the same in the US and the EU, it must be deployed with controls specific to the corresponding region. Irrespective of region, the company also implements PCI DSS in order to safeguard its financial transactions and user data. In addition, it defines a number of its own business rules with similar goals but supplemental guarantees important to the company.

Each cluster hosts many applications, and each application is deployed in phases to specific environments: dev, test, and prod. Each of these environments comes with slightly different business requirements. For example, the dev environment can only be accessed from within a shared private network while the prod environment provides selective access points for the public Internet so that the company's customers can reach their services. Finally, the individual Kubernetes clusters require authorization logic and other safeguards specific to their domains.

Considering the above, "stacks" can be established to fulfill most of these requirements so that individual Kubernetes clusters, operating environments, and applications do not need to repeatedly specify them. In addition, these requirements can be enforced across the Ace's organization with less risk of accidental (or even intentional) misconfiguration.

Figure 3:
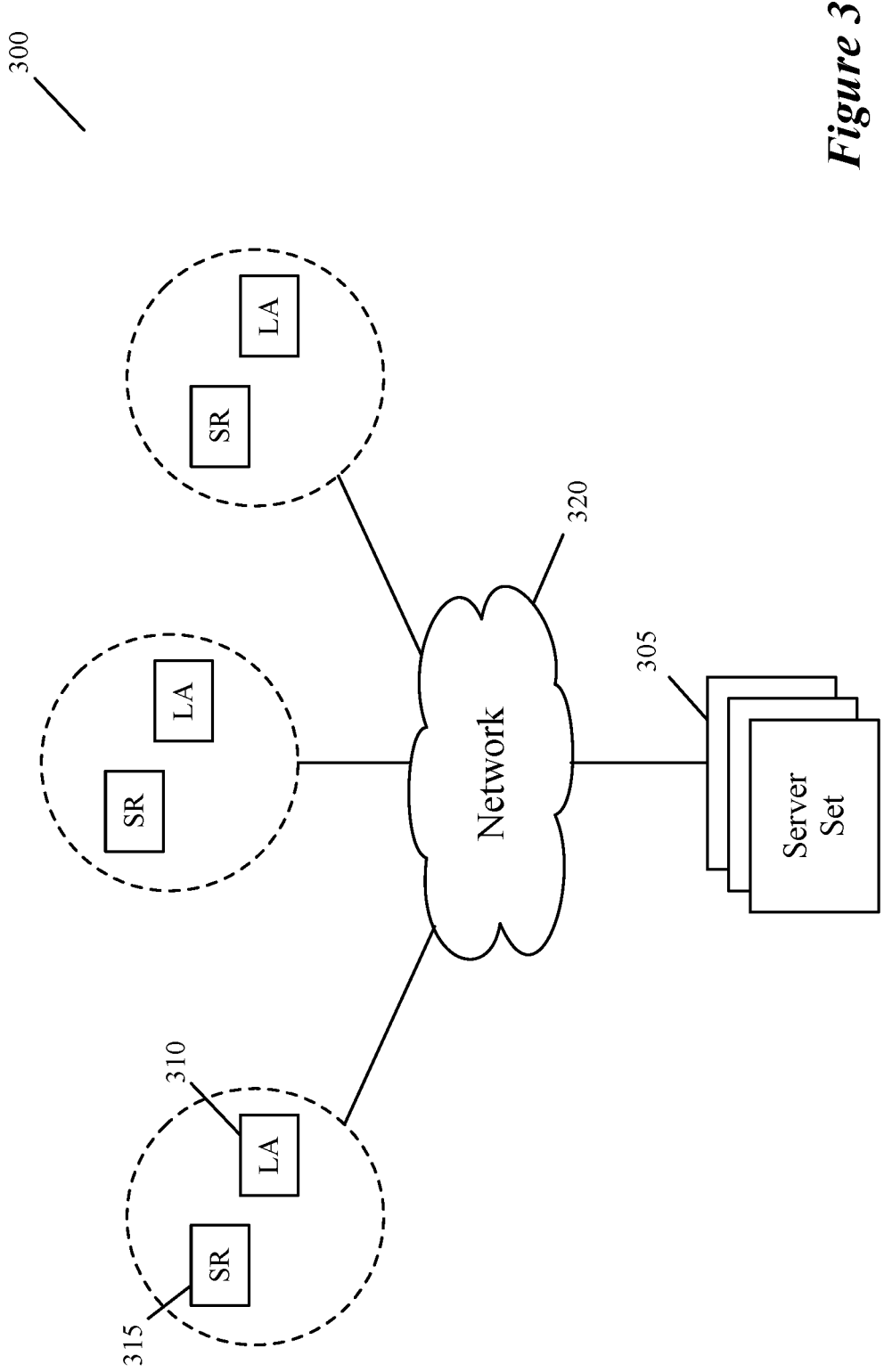
FIG. 3 illustrates an example of an API-authorizing platform of some embodiments.

Each stack is responsible for a specific area of enforcement. Although a stack might take responsibility for multiple areas, it's conceptually simpler for each distinct area to be handled separately. Ace can implement policies for the following areas with each policy defined in a separate stack:
 EU regulations
 US regulations
 PCI DSS
 Ace governance
 Dev environments
 Test environments
 Prod environments When the policies defined by stacks are combined with those defined by the individual clusters, many different rule sets are applicable to the EU and US Kubernetes clusters. These rule sets are:
 EU Kubernetes Cluster
  EU regulations
  PCI DSS
  Ace governance
  Dev environments
  Test environments
  Prod environments
  Cluster-specific rules
 US Kubernetes Cluster
  US regulations
  PCI DSS Ace governance
Dev environments
Test environments
Prod environments
Cluster-specific rules FIG. 3 illustrates an example of an API-authorizing platform 300 of some embodiments. As shown, the platform 300 includes (1) a set of one or more servers 305, and (2) several policy-enforcing local agents 310 that execute near the software resources 315 (e.g., applications, data storages, etc.). The server set 305 acts as a logically centralized resource for defining, storing, and distributing policies and parameters for evaluating these policies to the local agents. In some embodiments, the server set distributes different sets of policies and parameters through a network 320 to different local agents based on the policies that are relevant to the API-authorization processing for the applications associated with those agents.

From an associated software resource 315, a local agent 310 receives API-authorization requests to determine whether API calls received by the resource are authorized. In response to such a request, the local agent uses one or more parameters associated with the API call to identify a policy stored in its local policy storage to evaluate whether the API call should be authorized. To evaluate this policy, the agent might also retrieve one or more parameters from the local policy storage.

The local agent 310 then uses the received or retrieved parameters to evaluate the retrieved API-authorization policy in order to determine whether the API call should be approved or rejected. Based on this evaluation, the local agent then sends a reply to the application that sent the API-authorization request, to specify whether the API call should be approved or rejected. In some embodiments, the applications send the API-authorization requests as RPC (Remote Procedure Call) messages, and the local agents send their replies to these requests as RPC reply messages. In other embodiments, the applications send their API-authorization requests to the local agents through other mechanisms (such as other IPC (inter-process communication) messages) that initiate above the network stack.

A more specific example of the API-authorizing platform 300 of some embodiments is described in U.S. patent application Ser. No. 16/050,123, which is incorporated herein by reference. This incorporated application describes a server set that distributes API policies and operands in a namespace. It also described augmenting the API operands (e.g., the parameters needed to process the specified policies) locally on the host computers and/or clusters that execute the applications that receive the API calls.

Figure 4:
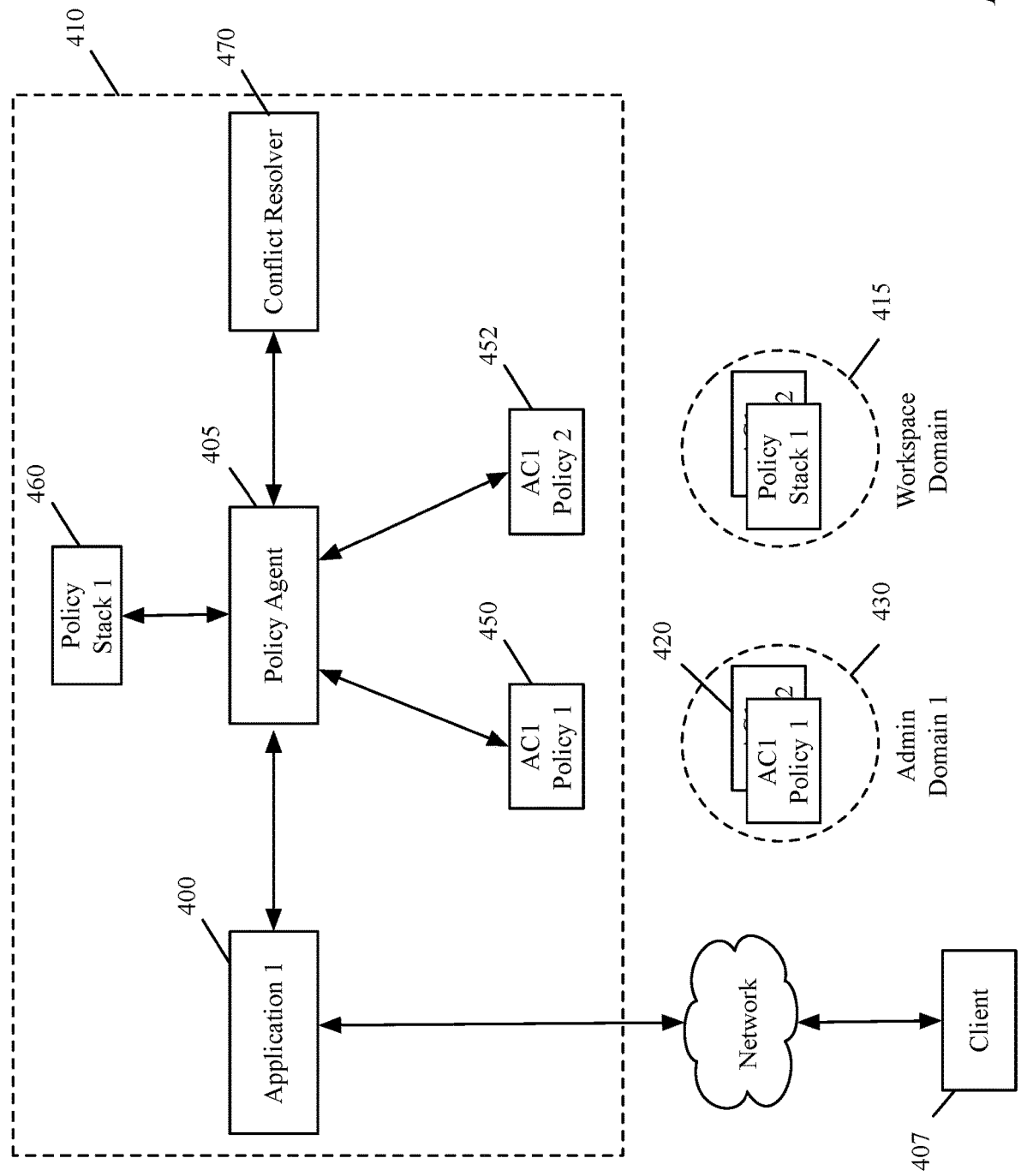
FIGS. 4 and 5 illustrate examples of local agents for two software resources.
Figure 5:
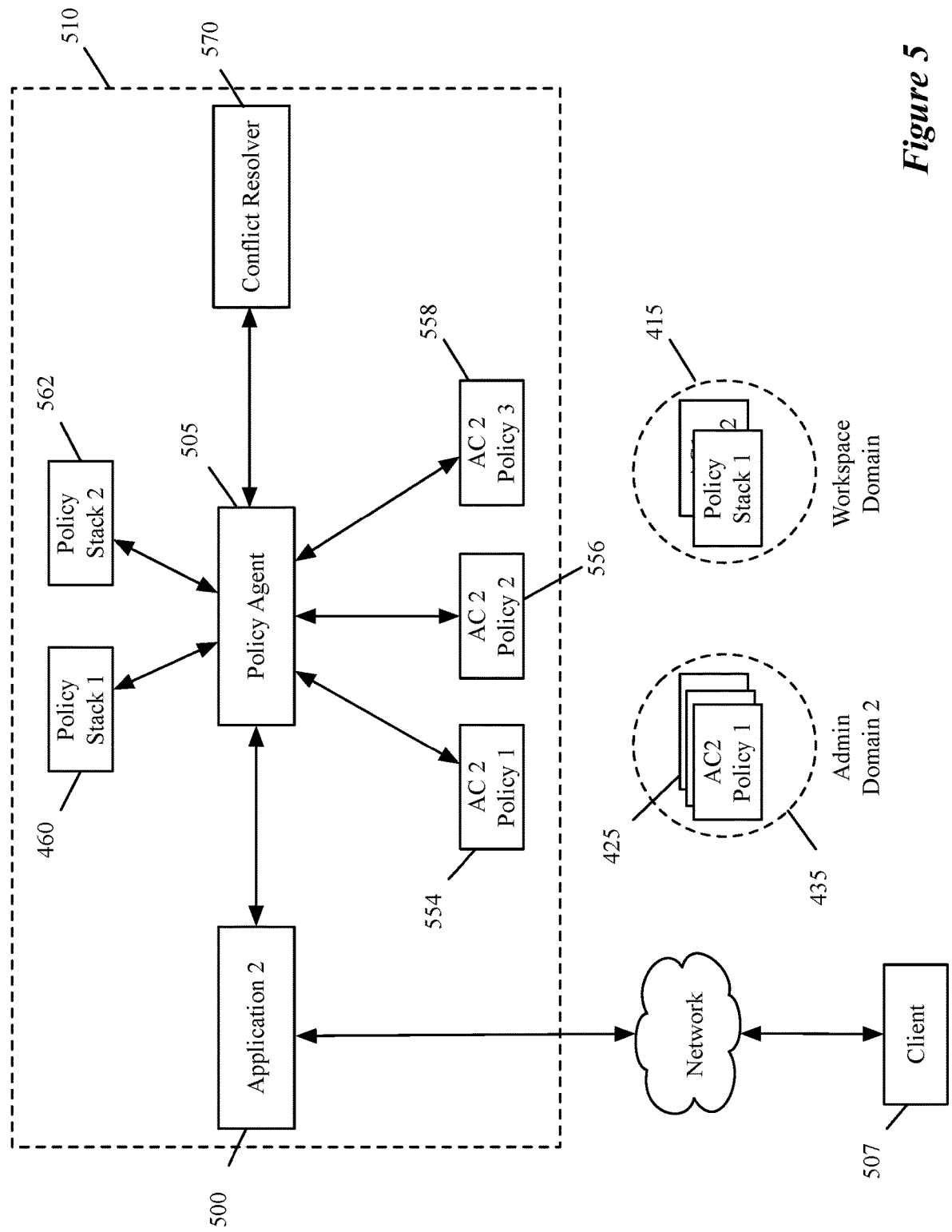

FIGS. 4 and 5 illustrate examples of local agents for two software resources 400 and 500. The software resources in these examples are applications to which API calls are directed. Also, in these examples, the local agents 405 and 505 execute in the same failure domains 410 and 510 as the applications 400 and 500. The failure domain 410 or 510 is a host computer (i.e., the local agent executes on the same host computer as its associated application) in some embodiments, while it is a virtual machine or container (i.e., the local agent executes on the same virtual machine or container as its associated application) in other embodiments.

The two applications 400 and 500 are part of two different application clusters 420 and 425 that are managed by two different sets of administrative domains 430 and 435. The administrator domain 430 includes one or more administrators for the first cluster 420 that specify two sets of system API-authorization policies 450 and 452 for the applications in the first cluster 420, while the administrator domain 435 includes one or more administrators for the second cluster 425 that specify three sets of system API-authorization policies 554, 556 and 558 for the applications in the second cluster 425. Also, a set of one or more workspace administrators 415 specifies two policy stacks 460 and 562, both of which apply to the applications (such as application 500) of the second cluster 425, while only policy stack 460 applies to the applications (such as application 400) of the first cluster 420.

FIGS. 4 and 5 show clients 407 and 507 making API calls to the applications 400 and 500 respectively. In this example, the clients 407 and 507 execute on different computers than the computers on which the applications 400 and 500 execute. Hence, the API calls are remote procedure calls made through one or more networks connecting their respective computers.

As shown, each application 400 or 500 directs its local agent 405 or 505 to determine whether the requested API call is authorized. Before using the local agents 405 and 505, the application 400 and 500 of some embodiments direct API-authentication agents (not shown) to authenticate the identities of the sources of the API calls (e.g., to validate the access credentials associated with the API calls). Only after the API-authentication agents authenticate the identities of the sources of the API calls, the applications 400 and 500 in some embodiments direct the local agents 405 and 505 to determine whether the API calls are authorized (i.e., whether the operation associated with the API call should be performed).

Each API-authorization agent 405 or 505 in some embodiments uses the system and stack policies associated with the application to evaluate whether application should process the API call as it is authorized. Specifically, in some embodiments, the agent 405 use the policy stack 460 and the system policy sets 450 and 452 to make its evaluation, while the agent 505 uses the policy stacks 460 and 562 and the system policy sets 554, 556 and 558 to make its evaluation. In FIG. 4, the application 400 rejects the API call as the agent 405 directs it to reject the call, while in FIG. 5, the application 500 processes the API call and based on this processing, provides a response to the client 507 as the agent 505 informs the application 500 that the API call is authorized.

API authorization conflicts can arise when two policy stacks that are applicable to an API call produce conflicting results (e.g., authorized versus rejected), when a policy stack and a system policy that are applicable to the API call produce conflicting results, or when two applicable system policies produce conflicting results. In some embodiments, the local agents 405 and 505 identify all system and stack policies applicable to an API call, analyze each identified applicable system/stack policy, and then determine whether the policy is authorized or not based on this analysis.

When the analysis of two or more identified policies produces conflicting results, the local agent 405 or 505 uses a conflict resolver 470 or 570 that uses a set of conflict resolution rules to resolve the conflicting results. The conflict resolvers in some embodiments are part of the local agents even though they are shown as separate modules for purposes of the illustrations in FIGS. 4 and 5. In some embodiments, the conflict resolution rules specify that system policies are subservient to the stack policies unless the stack policy produces a "Don't Care" in some embodiments, or otherwise specifies in other embodiments that it can be superseded by a system policy that rejects an API call when the stack policy allows it. This is the case in these embodiments in order to ensure that the common policies specified by stacks are enforced for all applicable managed systems uniformly.

To address the case when two or more policy stacks (e.g., stacks 460 and 562) produce conflicting responses for an API call to a software resource (e.g., application 500) that is part of a managed set of resources (e.g., the application cluster 425) to which the stacks apply, the conflict resolution scheme of the API-authorization platform in some embodiments relies on priority levels that can be assigned to specific policies. Specifically, in some embodiments, the platform allows stack policies to be specified with a priority level, such as low, medium or high. When two stack policies produce conflicting decisions for an API call (e.g., one specifies that the call should be rejected, while the other specifies that the call should be allowed), the stack policy with the higher priority wins. Handling conflicts will be further described below.

Figure 6:
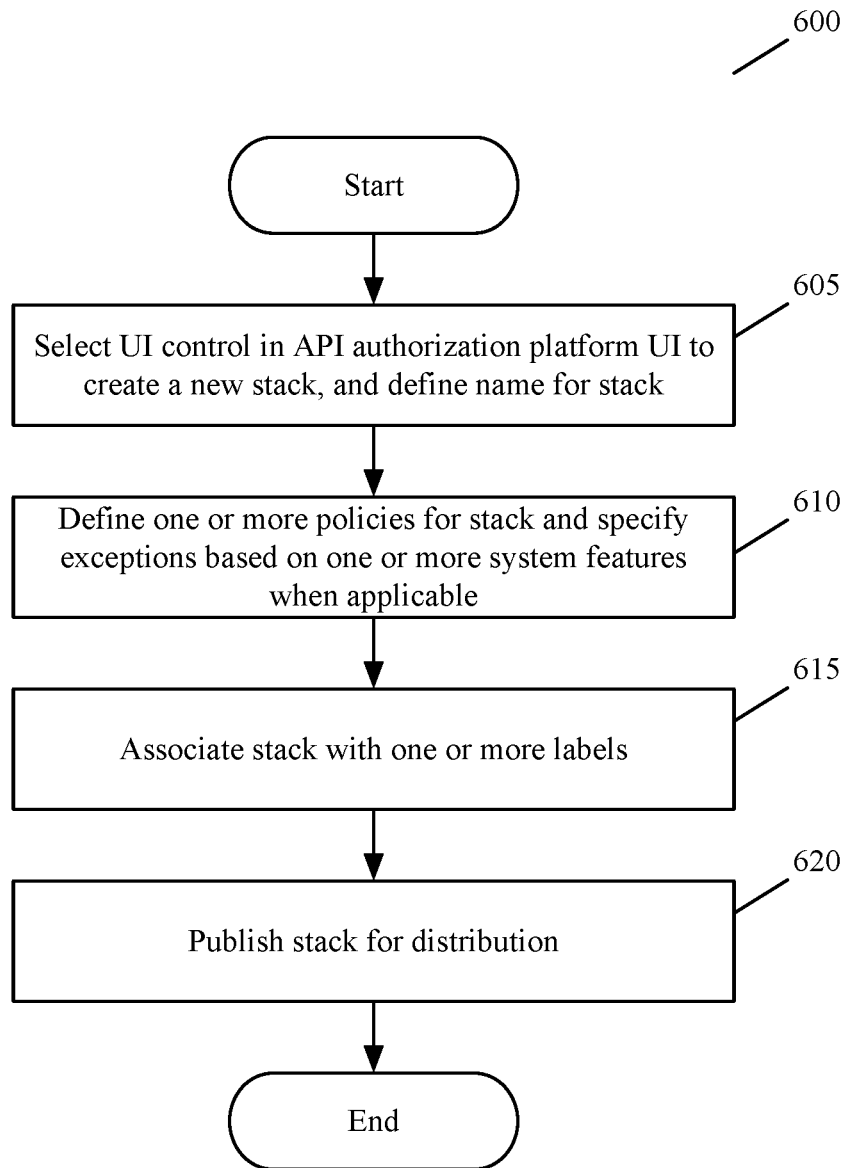
FIG. 6 presents a process that conceptually illustrates the operations that a workspace administrator performs in some embodiments to define a policy stack.
Figure 7:
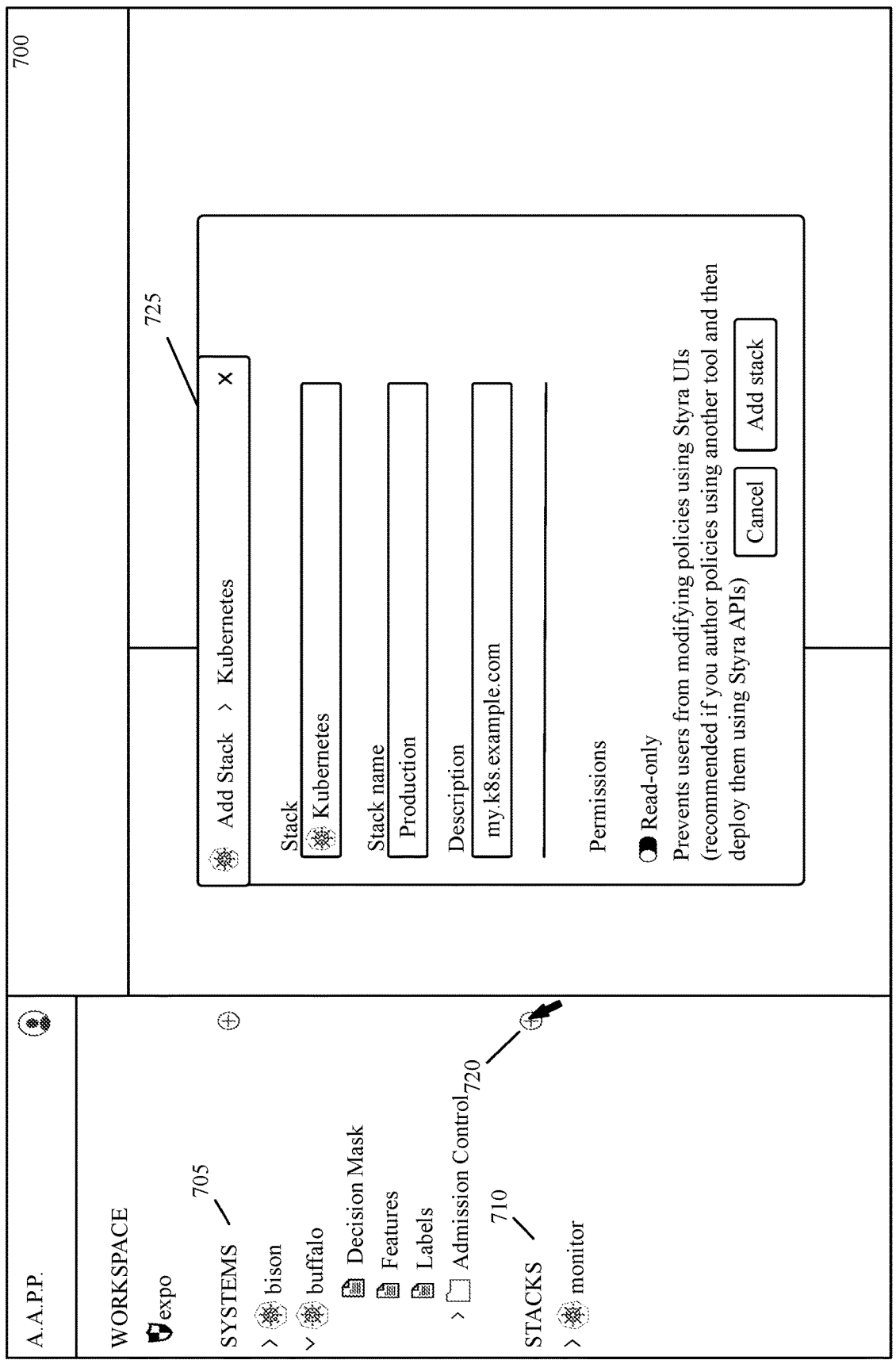
FIG. 7 illustrates one example of an example of an API authorization platform UI of some embodiments of the invention.

FIG. 6 presents a process 600 that conceptually illustrates the operations that a workspace administrator performs in some embodiments to define a policy stack. As shown, the process starts when the administrator (at 605) selects a user interface (UI) control in an API authorization policy platform (AAPP) UI to create a new stack, and then defines the name of the stack. FIG. 7 illustrates one example of an example of an AAPP UI 700 of some embodiments of the invention.

As shown, the UI 700 has a sidebar that has includes a managed system section 705 and a stack section 710. It further shows the user selecting a stack addition control 720 through a cursor click operation. This selection directs the UI 700 to display a window 725 through which the user can name the stack. In this case, the user has named the stack Production. Also, the stack in this example has a type Kubernetes, which specifies that the stack generally relates to Kubernetes clusters. The stacks applicability to specific Kubernetes clusters is controlled by managed system labels and features, as further described below.

After naming the stack, the workspace administrator defines (at 610) one or more policies for the stack with each policy specified by reference to one or more rules. The specified policies will control whether a local agent evaluating the policy stack will reject or approve an API call. The features of the managed systems can be used (at 610) to define exceptions to one or more policies of a specified stack.

FIG. 8 illustrates an example of one set of policies specified by one set of rules. This example shows that after the creation of the Production policy stack in FIG. 7, this stack is identified with the Production subsection 805 in the stack section 710. The Production subsection has a Selector control 810 and an Admission control 815. As further described below, the Selector control 810 is for associating one or more labels with the stack.

The Admission control 815, on the other hand, is for specifying the policies and rules of the stack. In FIG. 8, the Admission control 815 is used to specify rules for restricting the proxies that can be used for Kubernetes clusters to which the Production stack applies. These rules are specified in the Rego language used by the OPA (Open Policy Agent) engine. The specified rules in this example limit the proxies to three specific proxies, plus any proxies that are defined as acceptable features of a managed Kubernetes system to which the Production stack applies.

As mentioned above, and further discussed below, the acceptable features of a managed system in some embodiments have to be approved by a workspace administrator. In some such embodiments, a managed system administrator can request certain one or more features to be associated with the managed system, and the workspace administrator has to approve such a request. The features for a managed system are specified by a rich data structure that allows the system to be described at a very granular level, so that system and stack policies can be defined as being applicable or not applicable to the system by reference to these features.

Figure 9:
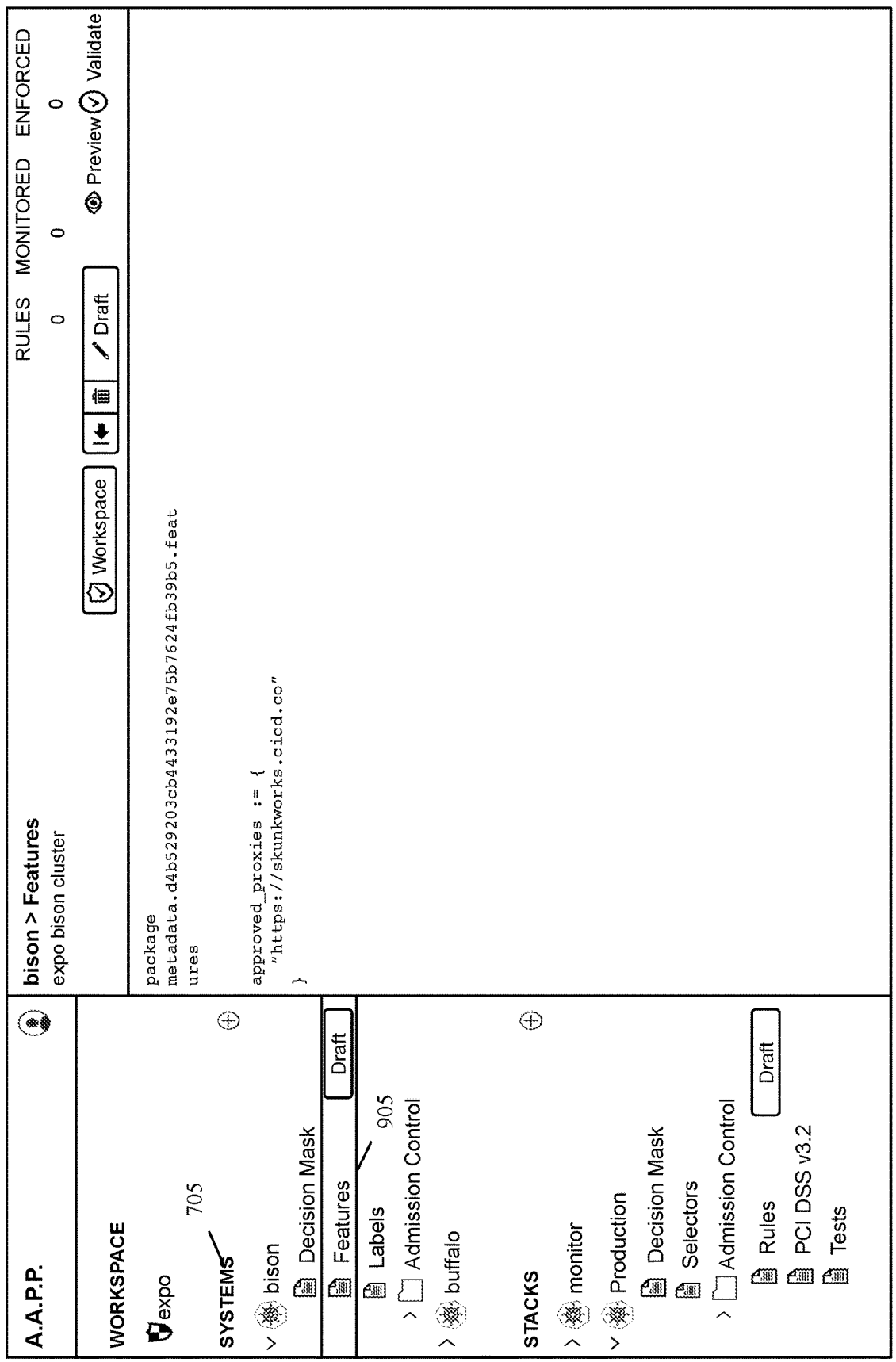
FIG. 9 illustrates an example of a features for a Kubernetes cluster.

FIG. 9 illustrates an example of the features for a bison Kubernetes cluster as including skunksworks.cicd.co as an acceptable proxy for this cluster. As shown by this example, the features for each system are displayed upon selection of a feature subsection 905 under the system section 705. For this example, different Kubernetes clusters (to which the Production stack applies) can be associated with different sets of acceptable proxies.

After defining (at 610) one or more policies for the stack, the workspace administrator associates (at 615) the stack with one or more labels. In some embodiments, each label is specified by a key value pair. As mentioned above, the API-authorization platform of some embodiments allows a workspace administrator to define the traits of the managed systems through labels (e.g., key value pairs) that are also associated with the stacks. Hence, at 615, the process specifies one or more labels that are associated with the stack that is being defined. As described above, and further described below by reference to FIG. 10, the stack's set of associated labels will later be used to identify managed systems to which the stack applies.

The AAPP UI in some embodiments provides the selector controls 810 to allow the workspace administrator to specify one or more labels associated with the stack. In some embodiments, any managed system to which the stack applies needs to be associated with at least one label that is specified for the stack through the selector control 810. In other embodiments, any managed system to which the stack applies needs to be associated with all the labels that are specified for the stack through the selector control 810.

FIG. 10 illustrates an example of specifying labels for the Production stack. In this example, the selector control 810 has been selected, which directs the AAPI UI to display a selector window 1000 that displays inclusionary and exclusionary label sections 1005 and 1010. Each of the sections allows one or more inclusionary or exclusionary labels to be specified. In FIG. 10, two inclusionary labels are associated with the Production stack in this example, and these two labels are:

Type=Production, and
Compliance=PCI.

These two key-value pairs specify that the Production stack is applicable to any Kubernetes cluster that is associated with the Production type label and PCI compliance label. Additional labels can be specified through the selection of add label control 1025, and previously specified labels can be deleted through the delete label control 1030.

As shown in this example, the AAPI UI also provide exclusionary label section 1010, through which the workspace administrator can specify labels that are not applicable to the specified stack. When a managed system is associated with an excluded label, the stack is deemed not to apply to the managed system even if the system is associated with other inclusionary labels. In this example, no exclusionary labels have been specified for the Production stack.

Once a stack's selectors have been defined, managed systems can be associated with the stack by associating the systems with the matching label(s). Labels codify a system's functions (e.g., production), contracts (e.g., pci-compliant), lifecycle (e.g., release), and other characteristics so that related subsets of systems can be selected and managed together. By default, every managed system in some embodiments has a system-type label (e.g., "system-type": "kubernetes").

In some embodiments, the simplest selector is just a label (i.e., a key-value pair such as "environment": {"production"}). Some embodiments, however, allows selectors to have additional expressivity. Each selector key in some embodiments corresponds to a list of values rather than a single string. Hence, more than one value can be matched per key (e.g., "environment" can be matched to "live" and "production"). Also, for a Boolean key, a value in some embodiments is not needed for the match since the mere presence of the key can be interpreted as True (e.g., "pci-compliant": new set( )).

The policy-managing platform in some embodiments also allows values to be glob-matched. For instance, some embodiments allow the use of special glob characters (such as "?" or any another single character) and * (zero or more characters) to match substrings between separator characters (., _, and -).

Figure 11:
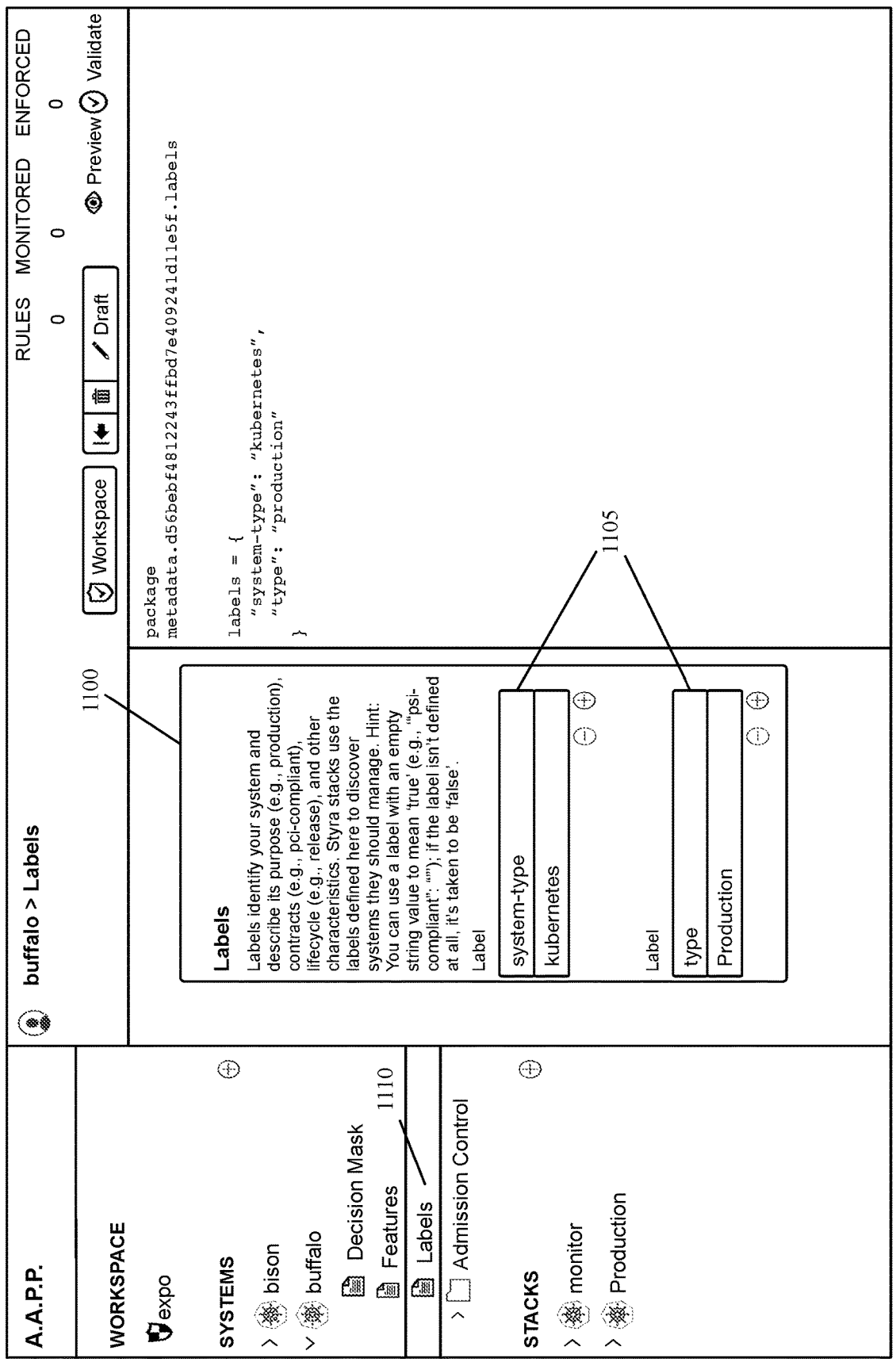
FIG. 11 illustrates an example of specifying labels for a managed system.

FIG. 11 illustrates an example of specifying labels for a managed system. In this example, the label control 1110 has been selected for a managed system called the buffalo system. This selection has been made by a workspace administrator because only the workspace administrators (and not the individual system administrators, such as the administrator of the buffalo system) can define the labels associated with any system, in order to ensure that the common set of policies that are provided by the policy stacks cannot be circumvented.

The selection of the label control 1110 directs the AAPI UI to display a label window 1100 that displays one or more label sections 1105. Each label section allows the workspace administrator to specify a label for the system. In Figure ii, two labels are associated with the buffalo system, and these two labels are:

System Type=Kubernetes, and
Type=Production.

After the stack has been defined, its policies and labels have been specified, the workspace administrator then publishes (at 620) the stack to the API authorization policy platform. This publication in turn directs the distribution modules of the server set 305 to distribute the stack to the local agents 310. In some embodiments, the server set 305 distributes all the stacks to all the local agents.

Figure 12:
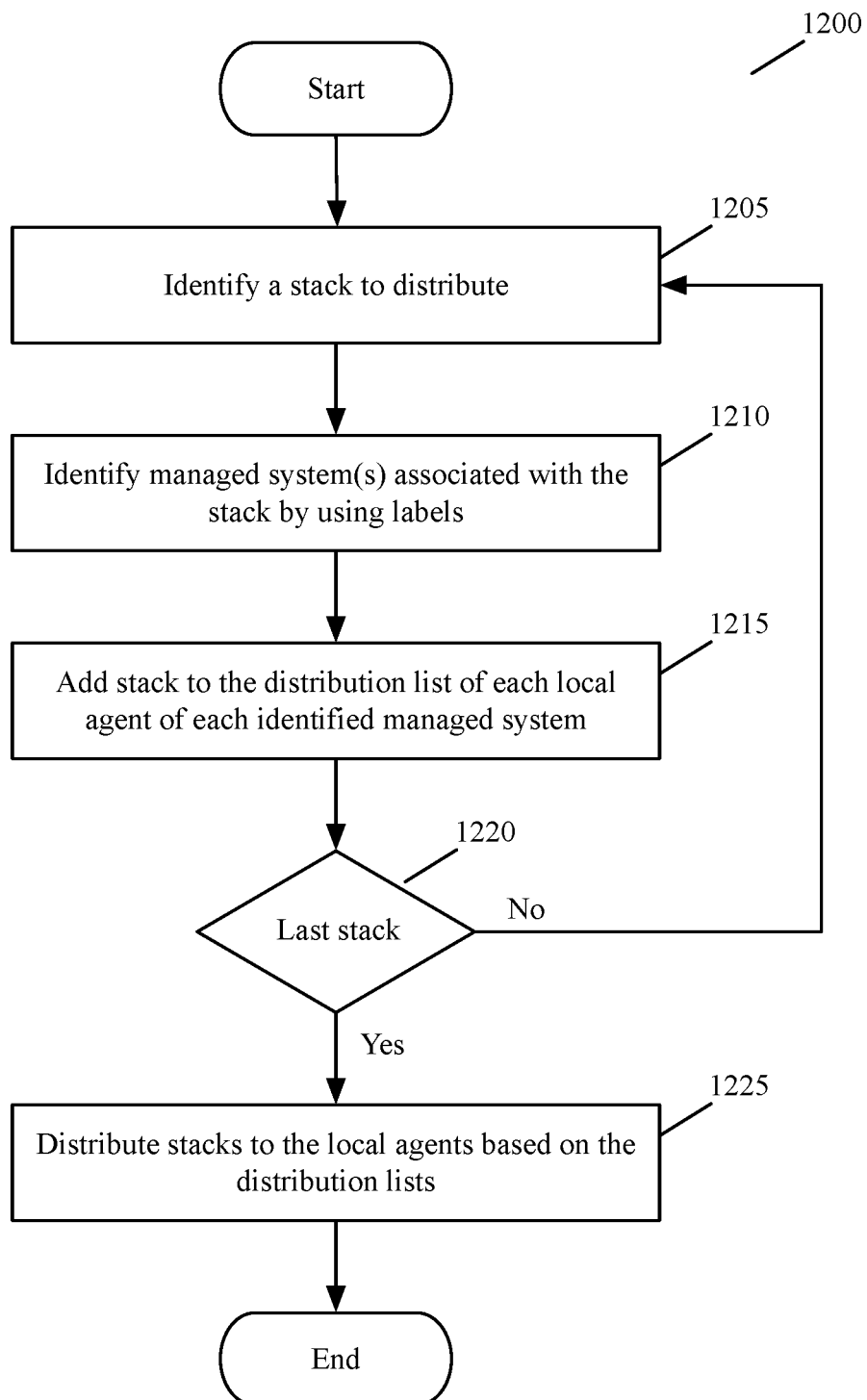
FIG. 12 illustrates a process for distributing policy stacks to policy enforcing agents.

In other embodiments, the server set distributes to each local agent only the stacks that are relevant to that local agent. For these embodiments, the server set performs the process 1200 of FIG. 12. As shown, the server set identifies (at 1205) a stack that it should distribute to the managed systems. For this stack, the server set then uses (at 1210) the labels associated with the stack and the managed systems to identify the set of managed systems associated with the stack. For instance, in some embodiments, the server set identifies (at 1210) each managed system that has labels that match the inclusionary labels of the identified stack and does not have labels that match the exclusionary labels of the identified stack.

The server set then adds (at 1215) the stack to the distribution list of stacks to distribute to each local agent for each managed system that it identified as a system to which the stack applies. Next, at 1220, the server set determines whether it has examined all the stacks that it needs to distribute. If so, it distributes (at 1225) to each local agent the stacks on the distribution list of that local agent, and then ends. Otherwise, the server set returns to 1205 to identify another stack that it needs to distribute, and to perform the other operations 1210-1215 for this stack.

Figure 13:
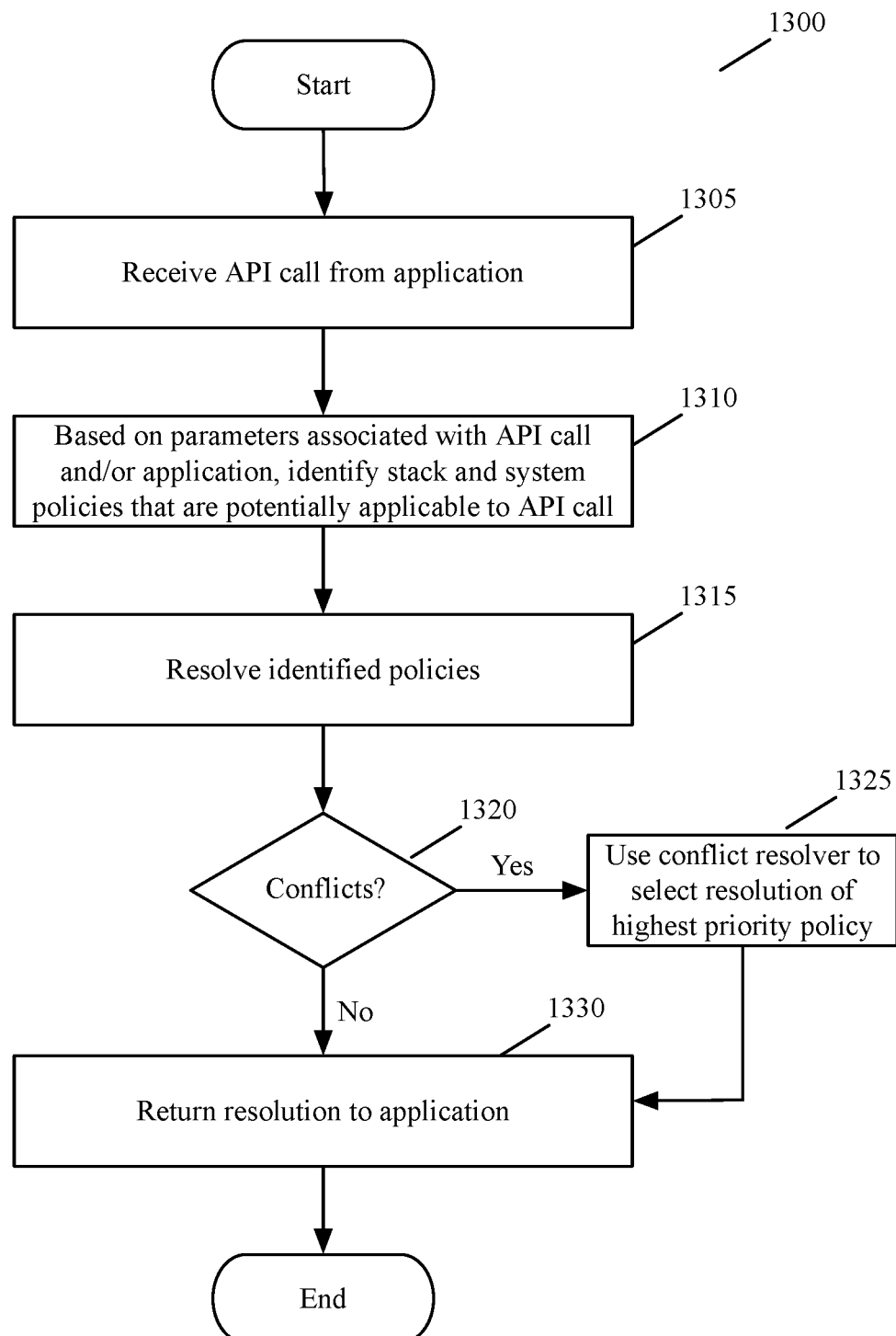
FIG. 13 illustrates a process that a policy agent performs in some embodiments to determine whether an API call to an application is authorized.

FIG. 13 illustrates a process 1300 that a policy agent (e.g., local agent 310, or policy agent 405 or 505) performs in some embodiments to determine whether an API call to an application is authorized. As shown, the process 1300 starts (at 1305) when the policy agent receives an API call to analyze. In some embodiments, the policy agent receives the request to authorize the API call from the application after the source of the API call has been authenticated (e.g., after the application has used a separate process or application to authenticate this source).

Next, at 1310, the process 1300 identifies one or more policy stacks and system policies that are applicable to the API call. In some embodiments, the process 1300 identifies the applicable stack and system policies by using one of our parameters associated with API call and/or the application that received API call. These parameters include the metadata associated with the application (e.g., the Kubernetes cluster associated with the application, the application type, etc.), the metadata associated with the API call (e.g., the type of request being made by the API call), and other dynamic data, such as a time of day for the API call.

One example of identifying potentially applicable stack and system policies for an API call is as follows. Assume that an application that is associated with a Kubernetes production cluster receives an API call. For such a call, the process 1300 identifies the stack policy specified for production Kubernetes clusters and any other system policies specified for such clusters in some embodiments.

After identifying the applicable stack and system policies, the process next processes (at 1315) these identified stack and system policies to determine whether any of the identified policies specify a particular resolution for the API call (i.e., specify whether the API call is authorized or not). Next, at 1320, the process determines whether multiple stack and system policies provided conflicting resolutions for the API call. If not, the process returns (at 1330) its resolution for the API call to the application (i.e., informs the application whether the API call is authorized or not) and then ends.

On the other hand, when the process determines (at 1320) that multiple stack and system policies provided conflicting resolutions for the API call, it uses (at 1325) its conflict resolver to identify the highest priority policy that specified a resolution for the API call, and to select the resolution provided by the identified highest priority policy as the resolution for the API call. From 1325, the process then transitions to 1330, where it returns its resolution for the API call to the application (i.e., informs the application whether the API call is authorized or not), and then ends.

To address conflicts arising from multiple different sets of policies provided by multiple different groups of administrators, some embodiments define decisions as structured objects so that they include the decision itself (e.g., allowed or not) along with metadata about the decision (e.g., a message explaining the rationale behind the decision), rather than just defining the decision as a reason string. For example, a rule implementation before stacks might look like this:

```
deny[reason] {
    reason := "Because I said so"
}
```

Instead of this approach, some embodiments define the rule:

```
enforce[decision] {
    decision := {
        "allowed": false,
        "message": "Because I said so"
    }
}
```

The outcomes of both rules in this example are the same, but the structured-object, second rule definition provides more information about the decision semantics. This additional information can be used to enhance the decision capabilities. For example, the decision's behavior can be altered to explicitly allow a condition (e.g., allowing all requests from a list of trusted superusers.)

```
enforce[decision] {
    decision := {
        "allowed": true,
        "message": "Because I said so",
        "priority": "maximum"
    }
}
```

When conflicts arise between decisions, the conflict resolvers (e.g., 470 or 570) of some embodiments use this metadata to choose the decision with the highest priority. The closer a decision is to the top of the following list, the higher its precedence.
1. Stack:
    a. not allowed and priority="maximum" (e.g., untrusted networks)
    b. allowed and priority="maximum" (e.g., superusers)
    c. not allowed
    d. allowed
2. System:
    a. not allowed and priority="maximum"
    b. allowed and priority="maximum"
    c. not allowed
    d. allowed In this example, stack decisions are higher priority than system decisions. Maximum priority decisions (decisions with priority==maximum) take precedence over decisions with no priority. Also, when two decisions are otherwise equal, deny beats allow in the above described conflict-resolution scheme.

As mentioned above, stack policies in some embodiments can provide exceptions for a specific system through the system's features module. This module allows a system administrator to define rich data that a stack can use in its policy implementations. For example, a Features module might include the following definition:

```
approved_proxies := {
    "https://skunkworks.cicd.co"
}
```

To use this in a stack rule, a system's features can be looked up using data.context.system_id as follows:

```
package admission_control
features := data. metadata[data. context. system_id].features
approved_proxies := {
    "https://us-cent-proxy.cicd.co",
    "https://us-east-proxy.cicd.co",
    "https://us-west-proxy.cicd.co"
}
    The rule can be defined as:
enforce[decision] {
    # title: Restrict Proxies
    has_prohibited_proxy
    decision := {
        "allowed": false,
        "message": sprintf("Proxy %v isn't approved", [proxy])
    }
}
has_prohibited_proxy {
    not features.approved_proxies == features.approved_proxies
    not approved_proxies[inputproxy]
}
has_prohibited_proxy {
    not features.approved_proxies[input.proxy]
    not approved_proxies[input.proxy]
}
```

In this example, any system that defines features.approved_proxies will be allowed to use the corresponding proxy servers in addition to those usually allowed by the stack.

As mentioned above, some embodiments do not allow anyone to define labels and features in order to ensure that stacks serve as a reliable policy-enforcement mechanism. For instance, in some embodiments, the policy-managing platform only provide an administrator of the TENANT-.ACMEpolicymanagingco.com the right to modify the Labels and Features modules. A system owner can have full control over the system but cannot modify any labels or features. A workspace administrator in some embodiments can add an owner to a system by adding the user's credentials (e.g., e-mail address) to the selected system.

Workspace modules include all stack modules and all the system features and labels modules. In some embodiments, system policy modules and workspace modules can be source controlled using Git. However, in some embodiments, the workspace source control is configured independently than system policy modules in order to maintain the separation of responsibility between stacks and systems.

The Git source control for the workspace can be set up by selecting the workspace and entering the Git credentials and other particulars in the Git Repository under Settings. For instance, the following sequence of operations are used in some embodiments to define the Git source control for the workspace:
1. Select the workspace from the inventory sidebar.
2. Click Settings.
3. Click Git Repository.
4. Enter your Git credentials and other particulars.
5. Click the Save changes button.

To implement stacks, the API-policy management platform of some embodiments provides the following resource types. A stack is a collection of settings and rules comparable to a system, but without a concrete target (e.g., a Kubernetes cluster) and intended to be applied across multiple systems that share a specific target type (e.g., Kubernetes) and function (e.g., production) or contract (e.g., PCI compliance). Stacks define a uniform set of rules that dependent systems follow so that these rules do not need to be specified repeatedly one system at a time. Also, in some embodiments, stacks make decisions with higher priority than their dependent systems so they can be used to implement organizational supervision and enforcement.

A selectors policy is a policy that allows a stack to discover its dependent systems (and exclude others) based on system labels. Each selector has a scope that is limited to one stack. One example of a selector policy is as follows:

```
package stacks["fd11aecfa3574794a490c68275373d2a"].selectors
systems[system_id] {
    labels := {
        "environment": "production"
    }
    excluded_labels := { }
    metadata = data.metadata[system_id]
    metadata.labels[key] == labels[key]
    metadata.labels[key] != excluded_labels[key]
}
```

A metadata policy is a workspace policy logically coupled to a system that describes the system so that it can be discovered and differentiated by stacks. There are two types of metadata policy in some embodiments: (1) labels, which codifies a system's functions (e.g., production) as well as its contracts (e.g., PCI compliance), and (2) features, which enumerates various kinds of exceptions that should be made when stacks apply rules to their dependent systems.

API metadata has a scope that is defined per system or stack. An example of an API metadata is as follows:
package metadata ["fd11aecfa3574794a490c68275373d2a"].api
type="kubernetes"

A label has a scope of one system. An example of a label is as follows:

```
package metadata["fd11aecfa3574794a490c68275373d2a"].labels
labels = {
    "compliance.cicd.co/pci": "",
    "environment": "production",
    "phase": "release"
}
```

A feature has a scope of one system. An example of a feature is as follows:

```
package metadata["fd11aecfa3574794a490c68275373d2a"].features
approved_proxies = {
    "https://skunkworks.cicd.co"
}
ignore_missing_labels = true
```

A system owner is an authorization role giving users control over a system instance and its encapsulated policies. A system owner is distinct from a workspace administrator, which gives users control over an entire workspace, including stacks, systems, and metadata policies.

A workspace Git-Save is an API service that associates workspace resources (such as system metadata policies) with a remote Git repository for version control purposes. This API in some embodiments is congruent with the system feature of the same name.

A structured decision is a collection of well-defined key-value pairs intended to replace existing reason strings as the explanation for, and documentation of factors contributing to, a decision. This data is the basis for conflict resolution, logging, timeseries, and other fine-grained decision analysis. An example of a structured decision is as follows:

```
decision := {
    "allow": false, # Outcome (false == "deny")
    "message": "...", # An explanation for the outcome
    "priority": "maximum", # Preempt other outcomes
    "details": {...} # Additional rule-specific details
}
```

A default decision policy is a built-in policy statically provisioned for each enforced system policy. The default decision policy is responsible for connecting the selected system to its intended stacks, composing the stacks' decisions with the system's own decisions, resolving decision conflicts, and ultimately producing a single target-appropriate result. The default decision policy in some embodiments ensures that evaluation is performed relative to the target data namespace so that, for example, import statements and other references function as expected. In some embodiments, a default decision policy is provisioned once per system per enforced policy. An example of a default decision policy

```
package system.admission_control
main = x {
    x := data.library.v1.stacks.decision.v1.main
        with data.context as {
            "policy": "admission_control",
            "system_id": "fd11aecfa3574794a490c68275373d2a"
        }
}
```

A default decision mask policy is a built-in policy statically provisioned for each decision mask policy. The default decision mask policy is responsible for connecting the selected system to its intended stacks and combining the stacks' masked JSON paths with the system's own to produce a complete list of data that should be omitted from logged decisions. The default decision mask policy has a scope of one per system type.

```
package system.log
mask = x {
    x := data.library.v1.system.log.v1.mask
        with data.context as {
            "policy": "log",
            "system_id": "fd11aecfa3574794a490c68275373d2a"
        }
}
```

A result integration policy is system/policy-specific (e.g., kubernetes.admission_control vs custom.rules) module used by the default decision policy to provide system/policy-appropriate conflict resolution, fail semantics, and result formatting. A result integration policy has a scope of one per system or policy type. An example of a result integration policy for Kubernetes admission control is as follows:

```
package result.kubernetes.admission_control
import data.library.v1.util.v1 as util
columns = [
    {
        "key": "namespace",
        "value": input.request.object.metadata.namespace,
        "type": "string"
    },
```

```
{
  "key": "username",
  "value": input.request.userInfo.username,
  "type": "string"
},
{
  "key": "operation",
  "value": input.request.operation,
  "type": "string"
},
{
  "key": "kind",
  "value": input.request.object.kind,
  "type": "string"
},
{
  "key": "kind",
  "value": input.request.object.kind,
  "type": "string"
}
]
outcome = with columns {
  resolution := util.allow_then_deny(data.outcome, {"allowed": true})
  with_columns :=util.merge_keys(resolution, {"columns": columns})
}
code = x {
  outcome.allowed == false
  x := 403
}
reason = x {
  outcome.allowed == false
  x := "Forbidden"
}
main ={
  "apiVersion": "admission.k8s.io/v1beta1",
  "kind": "AdmissionReview",
  "outcome": outcome,
  "response": {
    "allowed": outcome.allowed,
    "status": {
      "code": code,
      "message": outcome.message,
      "reason": reason
    }
  }
}
}
Istio (labels.result == "istio")
package result.istio
import data.library.v1.util.v1 as util
outcome = util.allow_then_deny(data.outcome, {"allowed": false})
main = result {
  # Only allow requests that are explicitly 'allowed == true'.
  outcome.allowed == true
  result := {
    "allowed": true,
    "outcome": outcome,
    "headers": {"x-ext-auth-allow": "yes"}
  }
} else = result {
  # Deny requests by default.
  result := {
    "allowed": false,
    "outcome": outcome,
    "headers": {"x-ext-auth-allow": "no"},
    "body": "Unauthorized Request"
  }
}
```

The following example of a default decision evaluation illustrates how the above-described resources are used conjunctively to enforce desired outcomes. Some embodiments use the procedure described below to compose policies from a selected system with zero or more policies from corresponding stacks to produce a final decision and a target-appropriate result object.

1. Evaluate: The complete set of evaluated rules is determined by:

Iterating over all of the selected system's policies and evaluating each rule named enforce or monitor.

Discovering policy stacks by comparing each stack's type to the selected system's type and evaluating the stack's selectors policy to determine if the selected system is included. Then iterating over the resulting policies and evaluating each rule named enforce or monitor with data.metadata.system.features set to the selected system's features. Stack rule implementations may use keys from the features object to modulate rule outcomes.

2. Explain: Each rule must be a so-called partial set definition (not a complete definition), with hit (as opposed to missed) rules contributing to the resulting set a structured decision as follows:

allow: boolean The outcome (false="deny")

priority: optional string Whether to preempt other outcomes ({"priority": "maximum"}="preempt")

message: optional string An explanation for the outcome details: optional object Supplemental rule-specific details 3. Resolve: All passing rules are reconciled using either a conflict resolution algorithm described below or a custom algorithm defined by the selected system's corresponding result integration policy in order to produce an intermediate outcome object.

4. Interpolate: The selected system's corresponding result integration policy (based on system type) generates a target-appropriate result object from outcome, including a final allowed decision based on the target's desired fail semantics. The result must include an outcome key so that policy-managing platform's decision factors will be preserved in OPA's decisions log. It may be subsequently processed by an OPA plugin (e.g., Istio) to ensure a fully target-compatible response (e.g., by stripping the outcome key).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
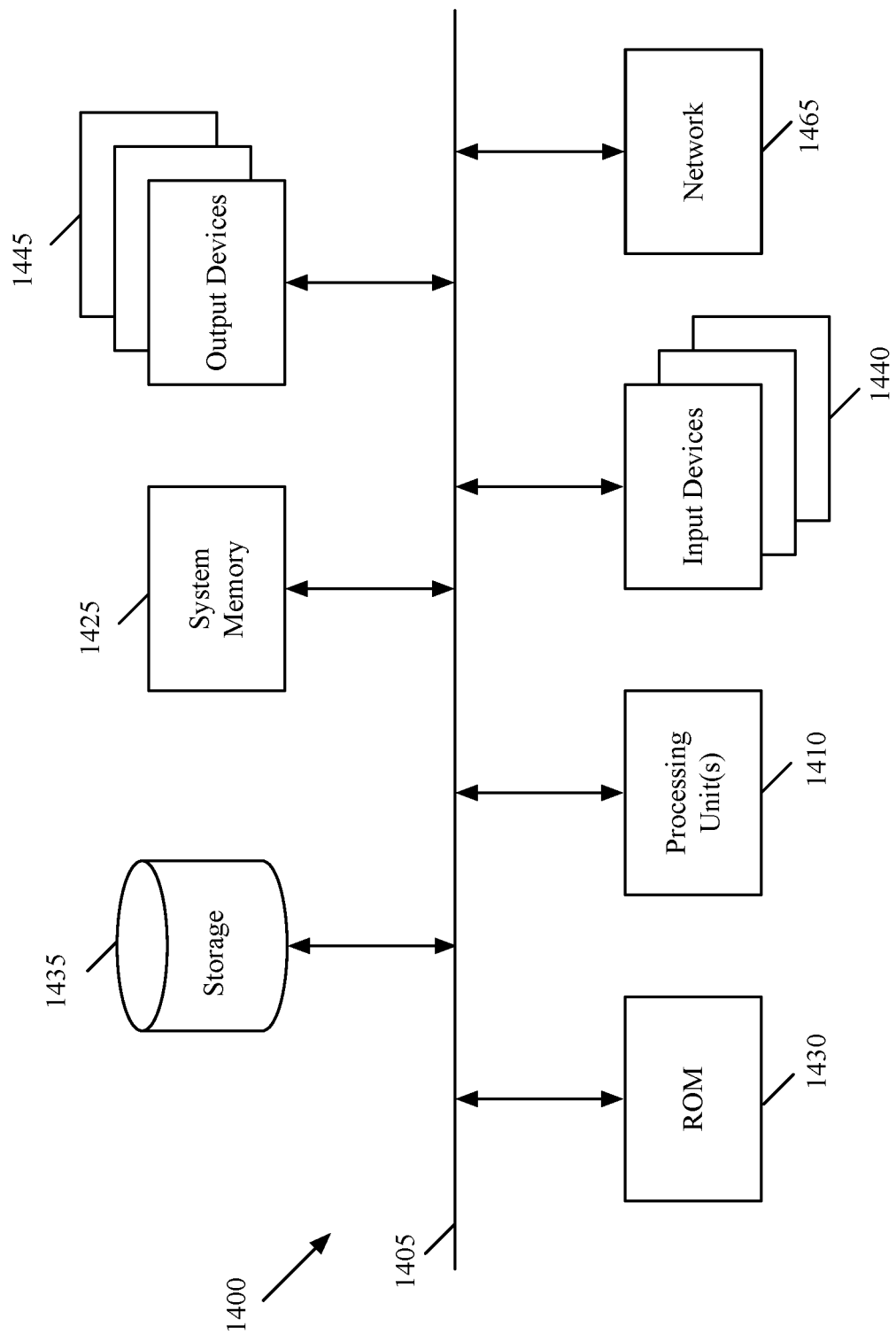
FIG. 14 conceptually illustrates an electronic system with which some embodiments of the invention are implemented.

FIG. 14 conceptually illustrates an electronic system 1400 with which some embodiments of the invention are implemented. The electronic system 1400 may be a computer (e.g., a desktop computer, personal computer, tablet computer, server computer, mainframe, a blade computer etc.), phone, PDA, or any other sort of electronic device. As shown, the electronic system includes various types of computer readable media and interfaces for various other types of computer readable media. Specifically, the electronic system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory (ROM) 1430, the system memory 1425, and the permanent storage device 1435. From these various memory units, the processing unit(s) 1410 retrieve instructions to execute and data to process in order to execute the processes of the invention. The processing unit(s) may be a single processor or a multi-core processor in different embodiments.

The ROM 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such a random access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several of the above-described embodiments have the local agents evaluate the policies based on the operands to determine whether to allow or reject API calls. In other embodiments, the local agents are implemented within the applications. For instance, some or all of the local agent functionality is embedded in a plugin that is installed in the API-processing application. In this manner, some or all of the above-described operations of the local agents are performed by plugins installed in the API-processing applications in some embodiments. In other embodiments, instead of implementing these operations with plugins, some embodiments have the local agent and/or server set update API rule configuration file of an API-processing application whenever the local namespace associated with the application is modified and this modification affects the application's processing of one or more API calls. Therefore, one of ordinary skill in the art would understand that the invention is not to be limited by the foregoing illustrative details, but rather is to be defined by the appended claims.

The invention claimed is:

1. A method of specifying policies for authorizing API (application programming interface) calls to different sets of managed resources managed by different sets of administrators, the method comprising:
   receiving a definition of a policy applicable to API calls to at least first and second sets of managed resources managed by first and second different sets of administrators;
   receiving, for the policy, a first attribute to compare with attributes defined for different sets of managed resources in order to identify the first and second sets of managed resources as managed resources to which the received policy is applicable; and
   publishing the policy with the first attribute in order to identify the resources to which the policy is applicable.

2. The method of claim 1, wherein receiving the policy definition and first attribute comprises receiving the policy definition and the first attribute from a particular administrator who is not in the first and second sets of administrators.

3. The method of claim 2, wherein the particular administrator is an administrator of a workspace in a set of one or more software define datacenters (SDDCs), while the first and second sets of administrators are administrators of first and second sets of resources in the SDDC set.

4. The method of claim 3, wherein the first and second sets of resources in the SDDC set are first and second clusters of Kubernetes compute nodes.

5. The method of claim 3, wherein the first and second sets of resources in the SDDC set are first and second distributed applications that execute in the SDDC set.

6. The method of claim 3, wherein the first and second sets of resources in the SDDC set are first and second distributed data storages that operate in the SDDC set.

7. The method of claim 2, wherein the particular administrator is an administrator of a workspace that operates in one or more datacenters, while the first and second sets of administrators are administrators of first and second sets of resources that are part of the workspace.

8. The method of claim 1 further comprising:
   receiving, for the policy, a second attribute to compare with attributes defined for different sets of managed resources in order to identify sets of managed resources as managed resources to which the received policy is applicable;
   wherein publishing the policy comprises publishing the policy with both the first and second attributes to a policy distribution engine that uses the first and second attribute to identify sets of resources to which the policy is applicable.

9. The method of claim 8, wherein the first and second attributes comprise labels that are compared with labels that are associated with the first and second sets of resources to describe the first and second sets of resources.

10. The method of claim 8, wherein each of the first and second attributes is specified as a key-value pair that is used to compare to one or more labels associated with each of the first and second sets of resources, each label associated with each set of resources also specified as a key-value pair that describes one aspect of the set of resources.

11. The method of claim 1, wherein the policy is a first policy, the method further comprising:
   receiving, for the first policy, a priority level to use to resolve a potential conflict between the first policy and a second policy that is specified for the first set of resources by the first set of administrators;
   wherein publishing the policy comprises publishing the policy with the first attribute and with the priority level.

12. The method of claim 11, wherein the second policy cannot override the first policy.

13. A non-transitory machine readable medium storing a program which when executed by at least one processing unit specifies policies for authorizing API (application programming interface) calls to different sets of managed resources managed by different sets of administrators, the program comprising sets of instructions for:
   receiving a definition of a policy applicable to API calls to at least first and second sets of managed resources managed by first and second different sets of administrators;
   receiving, for the policy, a first attribute to compare with attributes defined for different sets of managed resources in order to identify the first and second sets of managed resources as managed resources to which the received policy is applicable; and
   publishing the policy with the first attribute in order to identify the resources to which the policy is applicable.

14. The non-transitory machine readable medium of claim 13, wherein the set of instructions for receiving the policy definition and first attribute comprises a set of instructions for receiving the policy definition and the first attribute from a particular administrator who is not in the first and second sets of administrators.

15. The non-transitory machine readable medium of claim 14, wherein the particular administrator is an administrator of a workspace in a set of one or more software define datacenters (SDDCs), while the first and second sets of administrators are administrators of first and second sets of resources in the SDDC set.

16. The non-transitory machine readable medium of claim 15, wherein the first and second sets of resources in the SDDC set are first and second clusters of Kubernetes compute nodes.

17. The non-transitory machine readable medium of claim 15, wherein the first and second sets of resources in the SDDC set are first and second distributed applications that execute in the SDDC set.

18. The non-transitory machine readable medium of claim 15, wherein the first and second sets of resources in the SDDC set are first and second distributed data storages that operate in the SDDC set.

19. The non-transitory machine readable medium of claim 14, wherein the particular administrator is an administrator of a workspace that operates in one or more datacenters, while the first and second sets of administrators are administrators of first and second sets of resources that are part of the workspace.

20. The non-transitory machine readable medium of claim 13,
   wherein the program further comprises a set of instructions for receiving, for the policy, a second attribute to compare with attributes defined for different sets of managed resources in order to identify sets of managed resources as managed resources to which the received policy is applicable;
   wherein the set of instructions for publishing the policy comprises a set of instructions for publishing the policy with both the first and second attributes to a policy distribution engine that uses the first and second attribute to identify sets of resources to which the policy is applicable.

* * * * *